(12) United States Patent
Tokuyama et al.

(10) Patent No.: US 6,912,102 B2
(45) Date of Patent: Jun. 28, 2005

(54) MAGNETIC HEAD WITH IC THEREON WITH RECORDING FREQUENCY CONTROLLED ACCORDING TO IC POSITION

(75) Inventors: Mikio Tokuyama, Tsukuba (JP); Ryoichi Ichikawa, Ushiku (JP); Shigeo Nakamura, Odawara (JP); Toshihiko Shimizu, Yasato (JP); Hiromitsu Masuda, Chiyoda (JP); Hiromitsu Tokisue, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/859,226

(22) Filed: Jun. 3, 2004

(65) Prior Publication Data

US 2004/0218303 A1 Nov. 4, 2004

Related U.S. Application Data

(63) Continuation of application No. 09/859,531, filed on May 18, 2001, now Pat. No. 6,754,023.

(30) Foreign Application Priority Data

May 22, 2000 (JP) .................................. 2000-154343

(51) Int. Cl.⁷ ............................................. G11B 19/02
(52) U.S. Cl. ............................. 360/69; 360/75; 360/66
(58) Field of Search ........................... 360/66, 69, 75, 360/244.1

(56) References Cited

U.S. PATENT DOCUMENTS

| 4,638,383 A | 1/1987 | McGinlay et al. |
| 6,339,519 B1 | 1/2002 | Nomura et al. |
| 6,522,502 B1 | 2/2003 | Shiraishi et al. |
| 6,618,225 B2 | 9/2003 | Shimizu et al. |
| 2001/0000445 A1 | 4/2001 | Shiroishi |
| 2003/0053255 A1 | 3/2003 | Shimizu et al. |

FOREIGN PATENT DOCUMENTS

| JP | 11-195215 | 7/1999 |
| JP | 11-296803 | 10/1999 |

*Primary Examiner*—David Hudspeth
*Assistant Examiner*—Mitchell Slavitt
(74) *Attorney, Agent, or Firm*—Antonelli, Terry, Stout & Kraus, LLP

(57) ABSTRACT

A magnetic disk device having a magnetic disk for recording information, a rotary mechanism for rotating the magnetic disk, a magnetic head unit for recording information on the rotating magnetic disk, a slider having mounted thereon the magnetic head unit and flying over the rotating magnetic disk, a magnetic head supporting mechanism for supporting the slider, and a positioning mechanism for setting the magnetic head unit at a predetermined radial position. The magnetic head supporting mechanism has mounted thereon an integrated circuit (IC) for amplifying an information write/read signal of the magnetic head unit, and a control circuit is connected to the IC. A recording frequency is controlled according to the radial position of the IC on the magnetic disk by the control circuit.

2 Claims, 11 Drawing Sheets

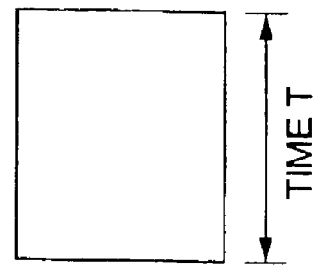
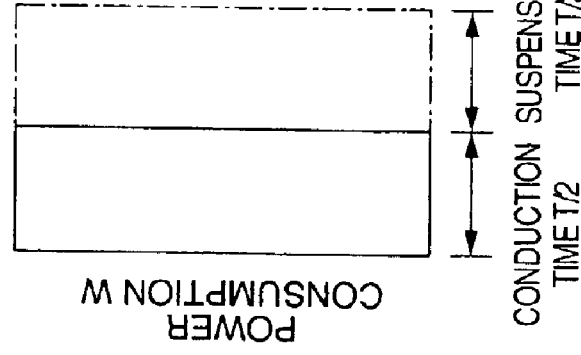
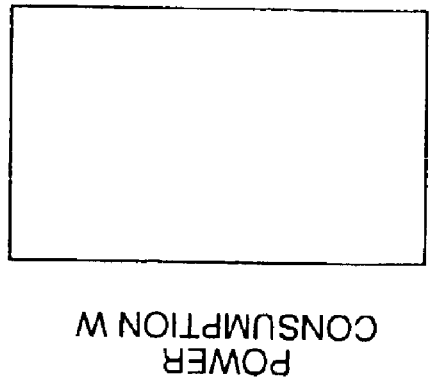

MAGNETIC HEAD WITH IC THEREON WITH RECORDING FREQUENCY CONTROLLED ACCORDING TO IC POSITION

CROSS REFERENCE TO RELATED APPLICATION

This is a continuation of U.S. application Ser. No. 09/859,531, filed May 18, 2001 now U.S. Pat. No. 6,754,023, the subject matter of which is incorporated by reference herein.

BACKGROUND OF THE INVENTION

The present invention relates to a magnetic disk device, and in particular to a magnetic disk device having a magnetic head supporting mechanism including at least an IC for amplifying information on a magnetic head unit.

Conventionally, an IC is arranged in opposed relation with a disk surface in order to cool the IC while maintaining the distance of not more than 1 mm between the disk and the IC as disclosed in JP-A-11-195215.

Also, JP-A-11-296803 discloses a magnetic disk device in which a control circuit connected to an IC, after supplying a write current to the magnetic head unit for a predetermined length of time, prevents the write current from flowing to the magnetic head unit for a suspension time not shorter than the particular predetermined length of time.

SUMMARY OF THE INVENTION

In arranging an IC in opposed relation to the disk surface, various problems are liable to occur. For example, the length of the wiring (flexible print circuit: FPC) laid between the IC and the magnetic head unit is restricted, the disk may be damaged by the IC and the disk coming into contact with each other under an external shock, and the IC junction facing down makes the pattern inspection (electrical inspection) difficult.

Also, the cooling effect (ability) of the air flow with the disk rotation is varied with the radial position of the IC. Thus, the time during which the continuous write operation can be performed on the magnetic head unit is different depending on the radial position of the IC. If the continuous write time and the suspension time are determined without taking the cooling ability depending on the radial position of the IC into account, therefore, the continuous write time may be limited to a time length which is provided when the IC is located at the inner peripheral position which is low in cooling ability. As a result, the otherwise available continuous write time (ability) based on the high cooling ability with the IC located on the outer peripheral position may fail to be used, resulting in a reduced utilization rate.

In order to solve the problems described above, the object of the present invention is to provide means for maintaining the temperature rise of the IC not higher than a tolerable temperature without arranging the IC chip in opposed relation to the disk surface.

According to one aspect of the invention, there is provided a magnetic disk device comprising an IC mounted on a magnetic head supporting mechanism, for amplifying the information write/read signal on the magnetic head unit, and a control circuit connected with the IC, wherein the power consumption for the write/read operation is controlled in accordance with the head position on the magnetic disk by the control circuit thereby to maintain the IC temperature at a level not higher than a predetermined temperature.

BRIEF DESCRIPTION OF THE DRAWINGS

FIGS. 5A, 5B and 5C are diagrams for explaining the concept of the duty factor of the conduction time of the IC.

DESCRIPTION OF THE EMBODIMENTS

Figure 12A:
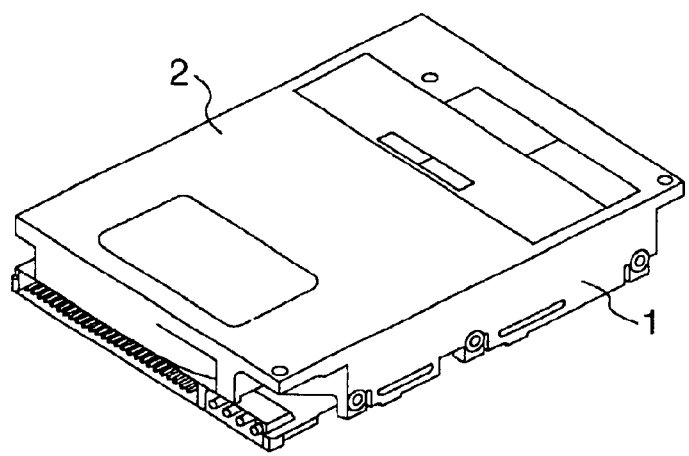
FIGS. 12A and 12B are diagrams showing a general configuration of a magnetic disk device with the cover attached and removed, respectively.
Figure 12B:
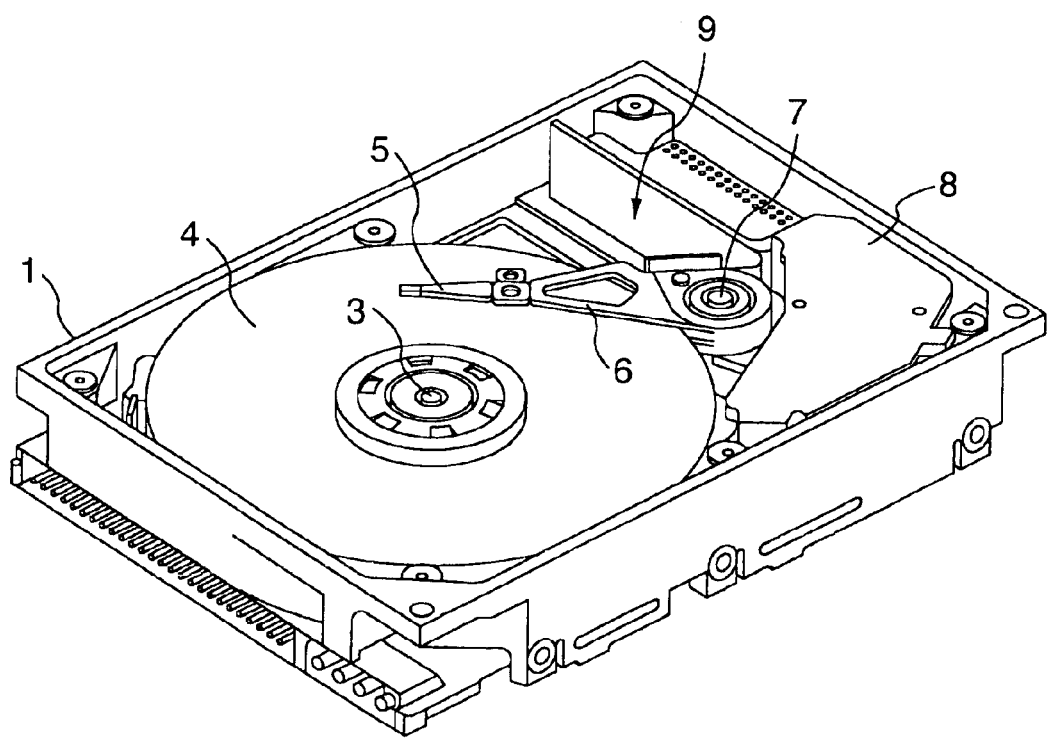

A first embodiment of the invention will be explained with reference to the accompanying drawings. FIGS. 12A, 12B show a general configuration of a magnetic disk device according to the invention.

As shown in FIG. 12A, the magnetic disk device is made up of a base 1 in the shape of a box having a magnetic disk and a magnetic head unit accommodated therein and hermetically sealed with a cover 2. As shown in FIG. 12B, the base 1 is configured to accommodate therein a magnetic disk 4 stacked on a spindle 3, and a positioning mechanism 9 including a magnetic head supporting mechanism 5 for supporting the magnetic head unit (not shown), a guide arm 6 coupled to the magnetic head supporting mechanism 5, a pivot bearing 7 and a voice coil motor 8.

Figure 1:
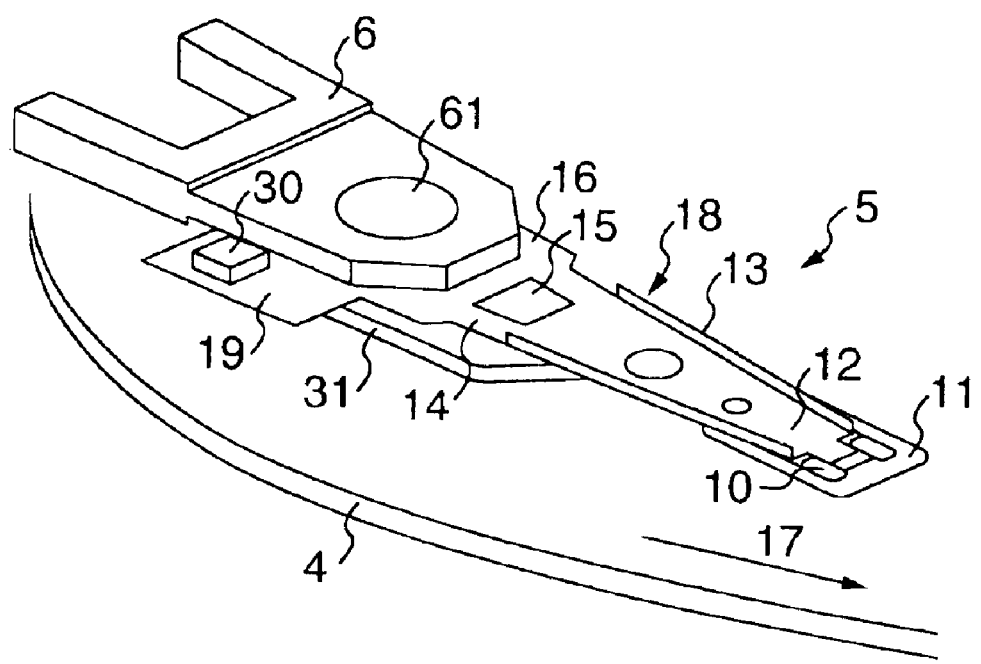
FIG. 1 shows a magnetic head supporting mechanism according to a first embodiment of the invention.
Figure 2:
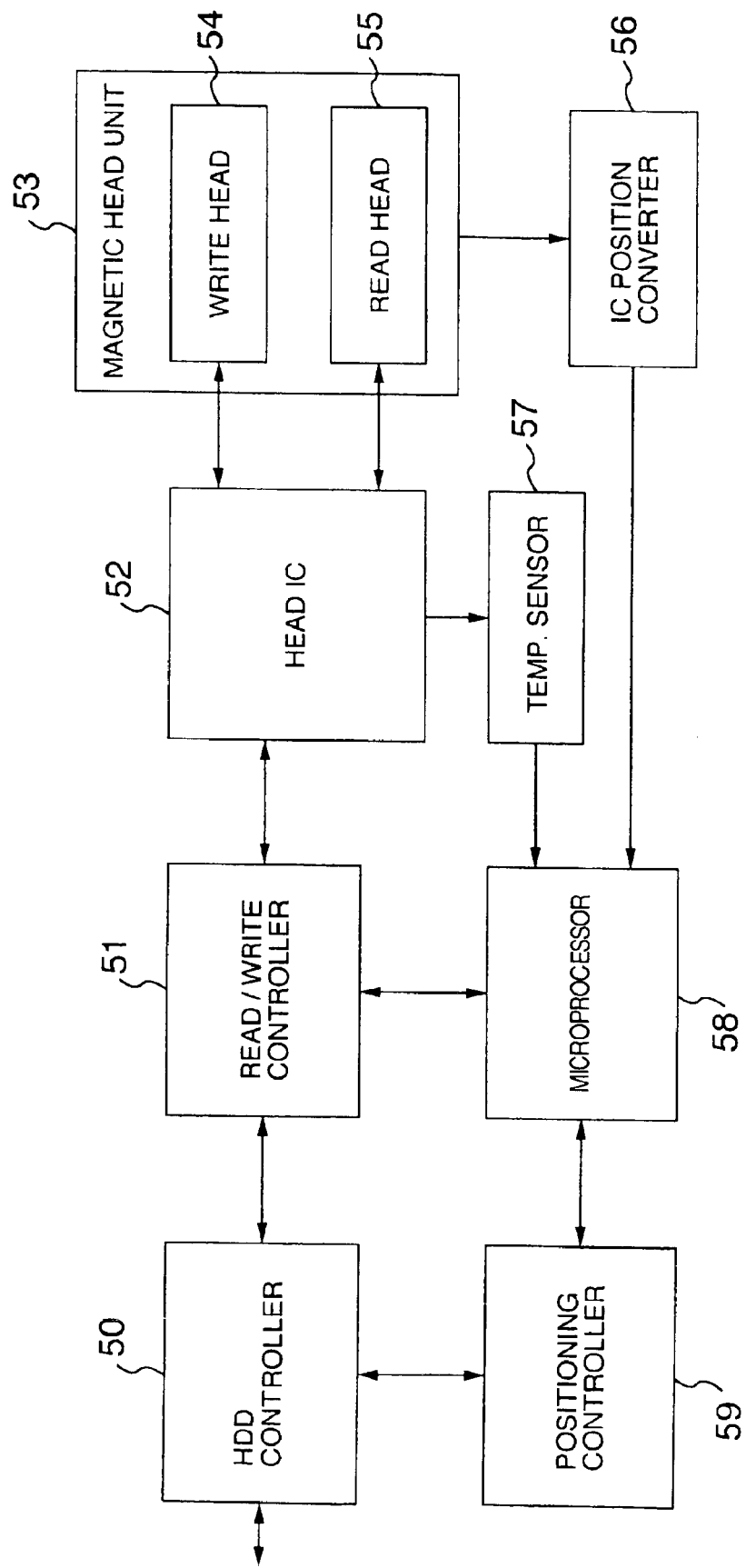
FIG. 2 is a block diagram showing the control circuit according to the first embodiment of the invention.

The configuration of the magnetic head supporting mechanism 5 is shown in detail in FIG. 1. FIG. 2 is a block diagram of a signal processing circuit for the magnetic head unit. A slider 10 on which the magnetic head unit (not shown) is mounted is supported on a flexure 11. The flexure 11 is coupled to a load beam 18 including a flat portion 12, a flange portion 13 and a spring portion 14. The magnetic head unit is adapted to write or read information by flying over or contacting the magnetic disk 4 rotating in the direction of arrow 17. The other end of the load beam 18 includes a guide arm coupler 16 for coupling to the guide arm 6 and an IC mount 19 for mounting a signal amplifier (hereinafter referred to as the IC) 30. The magnetic head supporting mechanism 5 is mounted in such a manner that a cylindrical mounter (not shown) arranged on the guide arm coupler 16 is caulked in the mounting hole 61 of the guide arm 6.

According to this embodiment, the load beam 18, the guide arm coupler 16 and the IC mount 17 are formed of a single thin plate. The spring portion 14 is formed with a window 15 for optimizing the spring rigidity. The IC 30 is connected to a wiring 31 extending from the magnetic head unit. The wiring 31 reaches the IC 30 from the magnetic head unit through the flexure 11. Also, the wiring from the IC 30 is connected to a read/write controller 51 as shown in FIG. 2. The read/write signal is transmitted and received through a HDD controller 50 between the magnetic disk device and an external computer not shown. The controllers 50 and 51 are usually incorporated in a circuit inside the magnetic disk device, but are not limited thereto and can be disposed anywhere.

Figure 3:
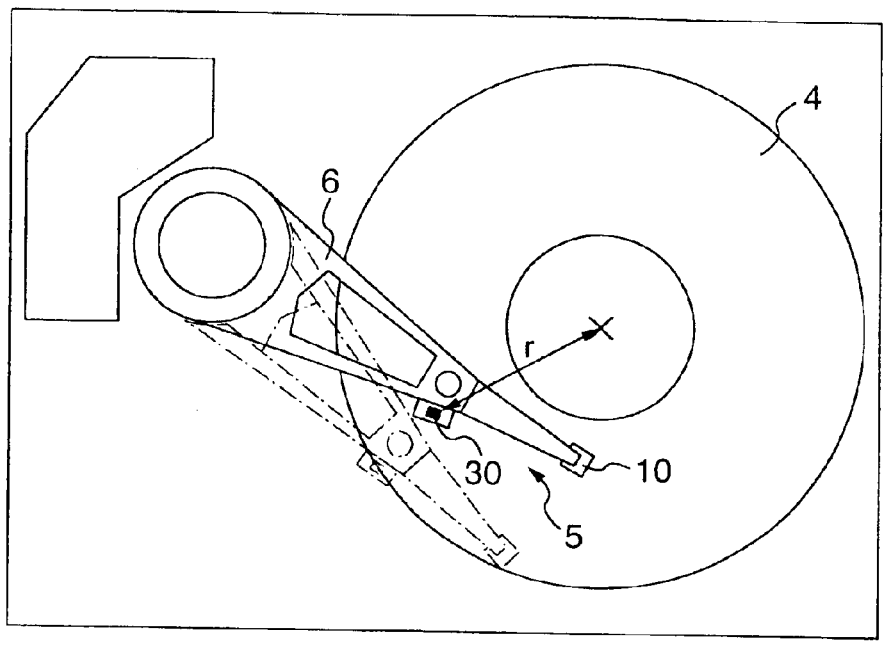
FIG. 3 is a diagram showing the relative positions of the head IC and the magnetic disk.

As shown in FIG. 3, the slider 10 moves between the inner periphery and the outer periphery of the magnetic disk 4. As a result, the radial position of the IC 30 moves from the inner periphery to the outer periphery. Let r be the distance from the center of rotation of the magnetic disk and the IC 30. The relation between the distance r and the power consumption (calorific value) of the IC, and the temperature rise of the IC with the change in the revolution speed N of the magnetic disk experimentally determined are shown in FIG. 4.

Figure 4:
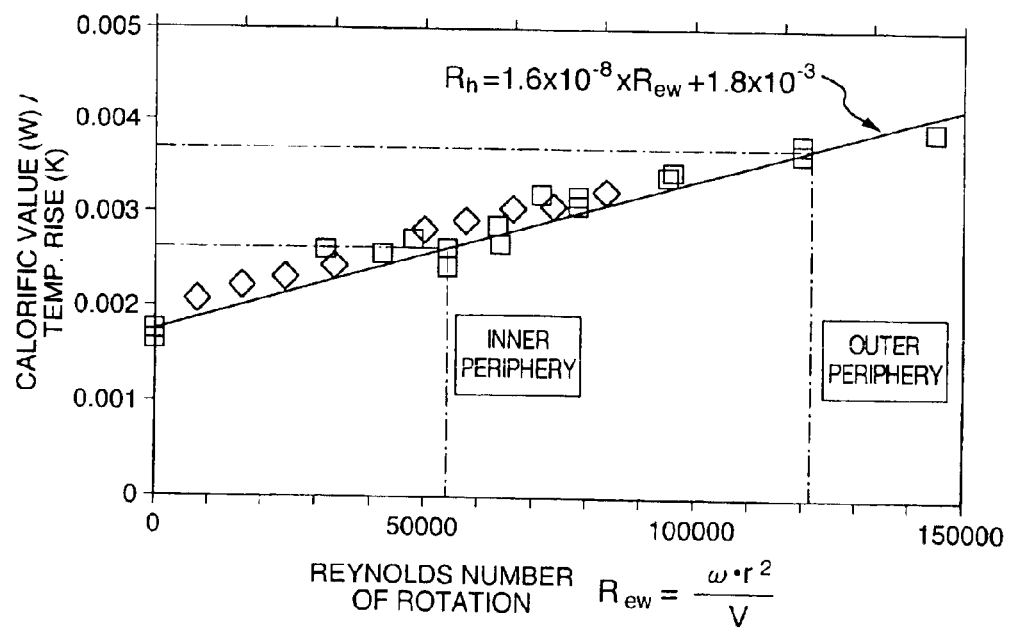
FIG. 4 is a diagram showing the relation between the thermal resistance and the Reynolds number of rotation.

In FIG. 4, the thermal resistance Rh at Rew=0 represents the thermal resistance Rh at the disk rotational speed of 0 (that is, when the disk is stationary). In other words, it indicates the thermal resistance due to the two effects including the heat conduction to the structure and the heat transmission by the natural convection. Also, FIG. 4 shows the thermal resistance Rh of the IC at the inner peripheral position and the outer peripheral position of the magnetic head unit. From FIG. 4, it is seen that as long as the IC power consumption (calorific value) is the same, Rh is larger and therefore the temperature rise is smaller on the outer periphery than on the inner periphery.

Table 1 shows the Reynolds number Rew of rotation, the thermal resistance Rh and the temperature rise for the power consumption of 400 mW on the middle and outer peripheries.

TABLE 1

| IC position | Reynolds number of rotation | Thermal resistance (calorific value W/temp rise K) | Temp. rise (K) at power consumption of 400 mW | Calorific value (mW) at temp. increase of 50 K | Duty factor (%) at temp. rise of 50 K |
|---|---|---|---|---|---|
| Inner periphery | $5.3 \times 10^4$ | 0.0026 | 160 | 125 | 31 |
| Middle periphery | $8.1 \times 10^4$ | 0.0031 | 129 | 155 | 38 |
| Outer periphery | $12.1 \times 10^4$ | 0.0037 | 108 | 185 | 46 |
| Remarks | | | | Carried out in first embodiment | Carried out in second embodiment |

Note:
Duty factor is the value for 400 mW

An explanation will be given in more detail with reference to FIG. 3. The magnetic disk device used in the experiment is 3.5 inch type. The IC used in the experiment has a heater and a temperature sensor built therein. The revolution speed is changed between 6000 r/min and 12000 r/min to study the relation between the power consumption and the temperature rise of the IC. As a result, as shown in FIG. 4, it has been found that all the measurements, organized using the relation between the Reynolds number of rotation Rew and the thermal resistance Rh (calorific value w/temperature rise k), can be expressed by the calculation formula of equation (1).

$$Rh = a \times 10^{-8} \times Rew + 1.8 \times 10^{-3} \quad (1)$$

where $Rew = \omega r^2/v$, $\omega$ is the angular velocity, $v$ is the kinematic viscosity coefficient, and a is an arbitrary numerical value between 1 and 2, or typically 1.6.

Table 1 shows that the continuous heating with the power consumption of 400 mW causes the IC temperature rise of 160 K on the inner peripheral position, which exceeds the IC junction temperature of 120□C. Normally, the temperature in the disk device is expected to increase up to 70□C, and therefore the tolerable temperature rise of the IC is required to be considered as 50 K in maximum. For suppressing the temperature rise of the IC chip to not more than 50 K, therefore, the power consumption at each radial position is set to 125, 155 and 185 mW or less for the inner periphery, the middle periphery and the outer periphery, respectively, as shown in Table 1.

Further, the results shown in Table 1, organized by making the power consumption at the inner peripheral position 1 is shown in Table 2. This table indicates that the power consumption on the outer peripheral position is tolerable up to 1.5 times higher.

TABLE 1

| IC position | Reynolds number Rew of rotation | Thermal resistance | Temp. rise at 400 mW of power consumption $5.3 \times 10^4$ | Calorific value at temp. rise of 50 K | Duty factor at temp. rise of 50 K |
|---|---|---|---|---|---|
| Inner periphery | $5.3 \times 10^4$ | 1 | 1 | 1 | 1 |
| Middle periphery | $8.1 \times 10^4$ | 1.2 | 0.81 | 1.2 | 1.2 |

TABLE 1-continued

| IC position | Reynolds number Rew of rotation | Thermal resistance | Temp. rise at 400 mW of power consumption 5.3 × 10⁴ | Calorific value at temp. rise of 50 K | Duty factor at temp. rise of 50 K |
|---|---|---|---|---|---|
| Outer periphery | 12.1 × 10⁴ | 1.5 | 0.68 | 1.5 | 1.5 |
| Remarks | | | | Carried out in first embodiment | Carried out in second embodiment |

Note:
Made dimensionless by the value at inner peripheral position

This result shows that according to the first embodiment, the IC power consumption may be made larger when the IC is located on the outer periphery than when it is located on the inner periphery of the magnetic disk 4. The difference $\Delta W$ in power consumption therebetween may be the one which satisfies the following relation determined by multiplying equation (1) by the tolerable temperature rise $\Delta T$ of the IC.

$$\Delta W \approx a \times 10^{-8} \times (Ro^2 - Ri^2) \omega / v \times \Delta T \qquad (2)$$

where $\omega$ is the angular velocity, $v$ the kinematic viscosity coefficient of air ($2 \times 10^{-5}$ m²/s), $\Delta W$ the power consumption difference (W), $\Delta T$ the tolerable temperature rise, a an arbitrary value between 1 and 2, or typically 1.6 and Ro and Ri outer and inner periphery positions of the IC, respectively.

FIG. 2 is a block diagram of the control system. As shown in the block diagram of FIG. 2, a microprocessor 58 calculates the increment of the power consumption allowed by the use at the outer peripheral position Ro with respect to the inner peripheral position Ri, from equation (4) and the radial position of the head unit IC 52 determined by an IC position converter 56 in response to a signal from the magnetic head unit 53 (made up of two heads including a write head 54 and a read head 55), and thereby controls the power supplied to the head IC 52 through a read/write controller 51. As a result, even in the case where the power supplied to the IC (power consumption) is increased, the temperature rise of the IC can be suppressed to not higher than the tolerable temperature.

In FIG. 2, the positioning controller 59 is for setting the magnetic head unit 53 at a predetermined radial position. A spindle controller, though not shown, for controlling the rotational speed of the magnetic disk is also included in the actual magnetic disk device. Also, the IC has therein a temperature sensor 57 making up a temperature detector to cut off the power to the IC in the case where the IC is heated abnormally. Specifically, in the case where the IC has reached the junction temperature of 120□ or higher, for example, the data write/read operation by the magnetic head unit is suspended. As a result, the damage to the IC can be prevented. Also, the power consumption can also be controlled using the information from this temperature sensor.

In the case where the write operation of the magnetic head unit is suspended, the (write) data is stored in the memory of the magnetic disk device (HDD). Thus, the performance of the magnetic disk device as viewed from the personal computer PC can be prevented from decreasing.

The aforementioned configuration makes it possible to supply the IC with the power commensurate with the cooling ability at the radial position of the IC. As a result, the power supplied to the IC can be increased progressively from inner to outer periphery while suppressing the temperature rise of the IC to a predetermined level. Thus, the IC capacity can be utilized to maximum. As a specific example, the write (read) frequency (capacity) of the IC, i.e. the read/write speed can be increased progressively from inner to outer periphery. In this way, the read/write performance of the magnetic head unit can be improved while keeping the IC temperature rise within a tolerable range.

A second embodiment of the invention will be explained with reference to FIGS. 5A, 5B, 5C, 6 and Tables 1, 2. According to the first embodiment, the optimization of the power consumption of the IC at each radial position was considered on the assumption that the power (power consumption) corresponding to the radial position is supplied continuously to the IC. In the case where the IC is operating normally, on the other hand, a specified power (power consumption) may be required. According to the second embodiment, therefore, a system is employed in which the specified operation power is supplied for a short length of time to assure normal IC operation, after which a suspension time is provided. The ratio between the heating time and the suspension time (duty factor) is optimized, so that like in the first embodiment, the rated power is supplied to the IC while suppressing the IC temperature rise within a predetermined value. As a result, the operation efficiency of the IC can be maximized. FIGS. 5A, 5B and 5C show the concept of the duty factor. In the case where the rated power consumption W is required, assume that the conduction time T is reduced to one half so that the suspension time is the same as the conduction time (i.e. 50% in duty factor). Then, it is thermally (i.e. from the viewpoint of the IC temperature rise) equivalent to the case where the continuous heating is carried out with one half of the power consumption (W/2).

$$\text{Duty factor } D = Tw/(Tw+Tk) \qquad (3)$$

where Tw is the continuous conduction time, and Tk the suspension time.

In the case where the rated power consumption of the IC is 400 mW, therefore, the duty factor thereof may be set to 31%, 38% and 46% for the inner periphery, middle periphery and the outer periphery, respectively, as shown in Table 1. In the case where the duty factor for the inner periphery is set to unity, on the other hand, the value for the outer periphery can be set to 1.5 times larger as shown in Table 2. It is thus see that the duty factor for the outer periphery can be increased beyond the value for the inner periphery and the ratio can be set to about 1.5. As a result, the predetermined rated power can be supplied to the IC while suppressing the IC temperature within the tolerable temperature rise.

Figure 6:
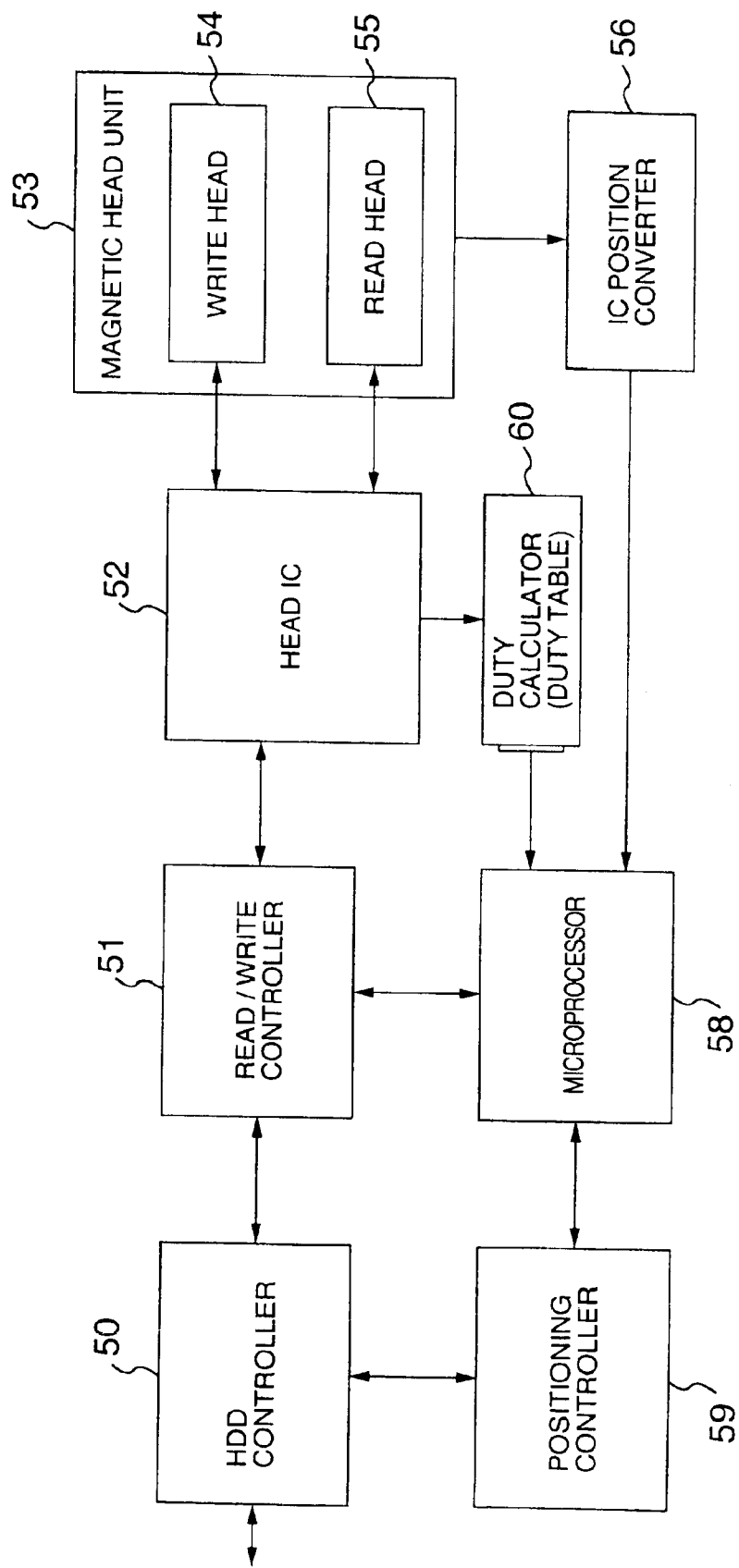
FIG. 6 is a block diagram showing the control circuit according to a second embodiment of the invention.

FIG. 6 shows a block diagram for explaining the operation. The present embodiment is different from the first embodiment shown in FIG. 2 in that a duty factor calculator 60 corresponding to the radial position of the IC is provided. A duty factor table can be provided in place of the duty factor calculator 60. Based on the result of the calculation result of the duty factor calculator 60, the microprocessor 58 controls the read/write controller 51 to secure a predetermined value of the duty factor corresponding to the radial position of the IC, thereby supplying the predetermined power to the head IC 52 for a predetermined length of time (corresponding to the duty factor). Thus, like in the first embodiment, the temperature rise of the IC is suppressed within the tolerable value, while at the same time making it possible to maximize the IC efficiency, i.e. the read/write performance of the head unit.

Figure 7:
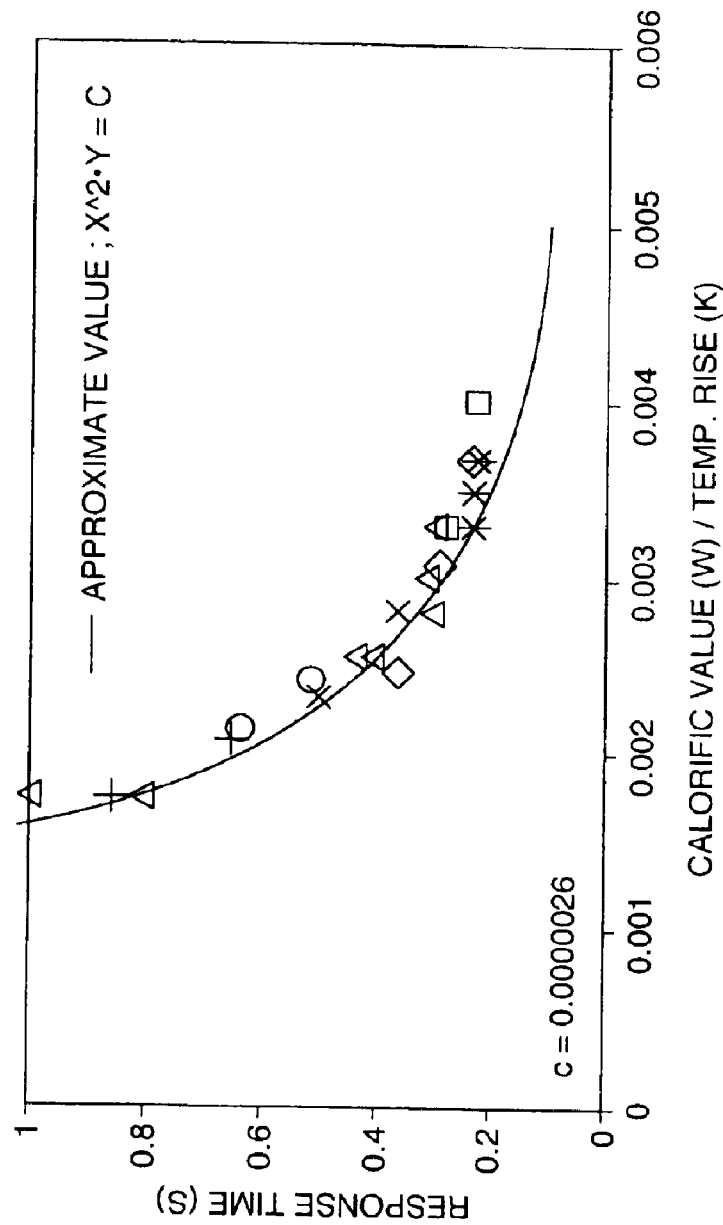
FIG. 7 is a diagram showing the relation between the calorific value and the response time according to a third embodiment of the invention.
Figure 8:
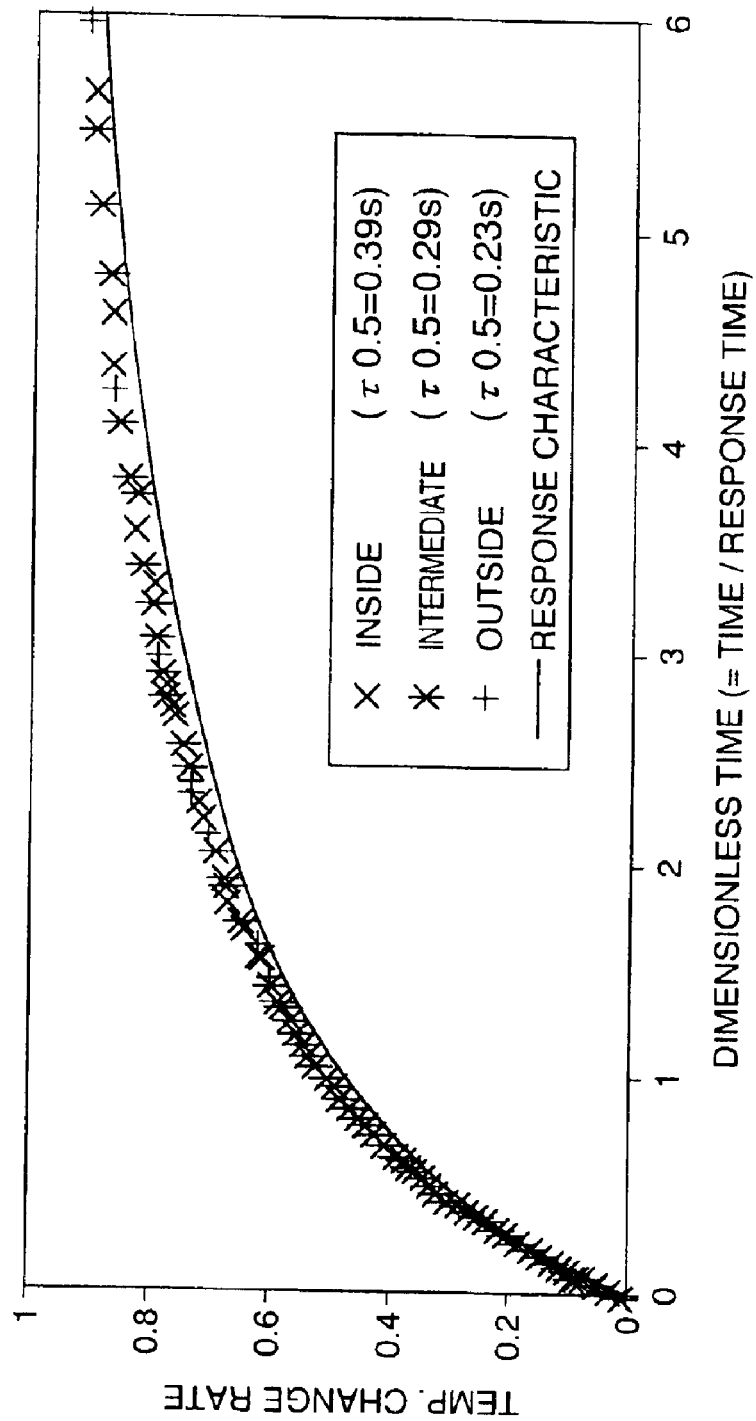
FIG. 8 is a diagram showing the relation between the response time and the temperature change according to the third embodiment of the invention.

The third embodiment of the invention will be explained with reference to FIGS. 7, 8 and Table 3. FIG. 7 shows the relation between the response time and the thermal resistance Rh (calorific value W/temperature rise K) determined by the Reynolds number Rew of rotation, and FIG. 8 the relation between the dimensionless time and the temperature change. These diagrams are based on the formulae determined by the experiments conducted by the inventors. Assume that the tolerable temperature rise of the IC is 50 K and the rated power of the IC is 400 mW. The time required before reaching 50 K assumes the values shown in Table 3.

TABLE 3

| IC position | Reynolds number Rew of rotation | Tolerable time(s) at 400 mW | Tolerable time(s) at 500 mW |
|---|---|---|---|
| Inner periphery | $5.3 \times 10^4$ | 0.17 | 0.13 |
| Middle periphery | $8.1 \times 10^4$ | 0.19 | 0.13 |
| Outer periphery | $12.1 \times 10^4$ | 0.20 | 0.13 |

As shown in Table 3, the values are substantially the same for the inner and outer peripheries, although the value for the outer periphery is somewhat longer than the value for the inner periphery. These values are 0.17 s, 0.19 s and 0.2 s for the inner periphery, the middle periphery and the outer periphery, respectively. This indicates that by reducing the continuous conduction time to 0.17 s or less, the IC temperature rise can be reduced to lower than the tolerable temperature even when the rated power of 400 mW is supplied, thereby producing the same effect as the first embodiment. Also, in the case where the rated power of the IC is 500 mW, the continuous conduction time may be set to 0.13 s or less.

Figure 9:
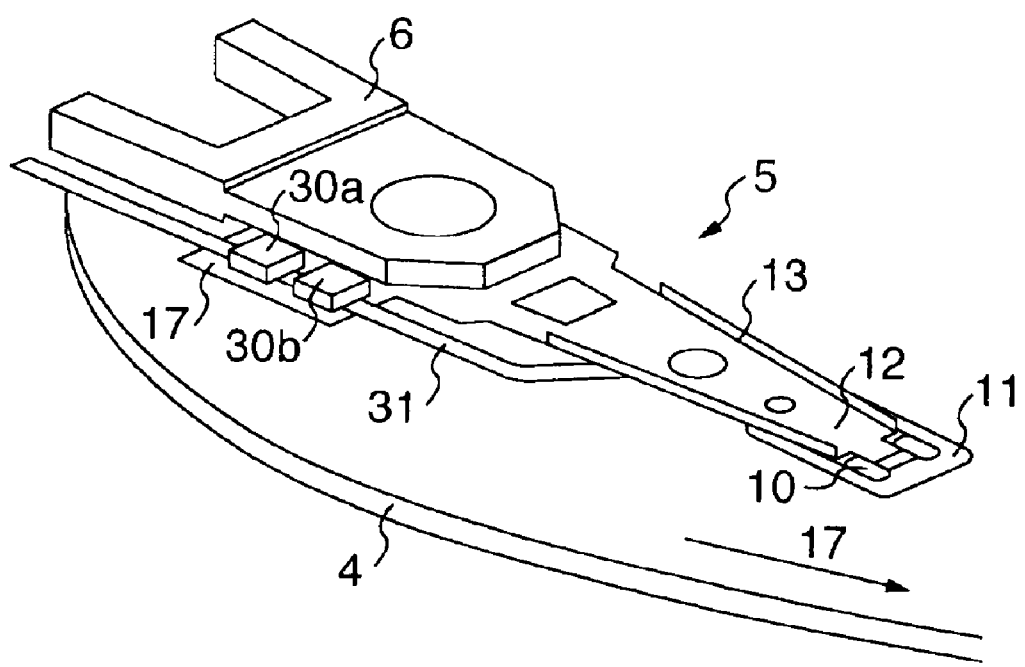
FIG. 9 shows a magnetic head supporting mechanism according to a fourth embodiment of the invention.
Figure 10:
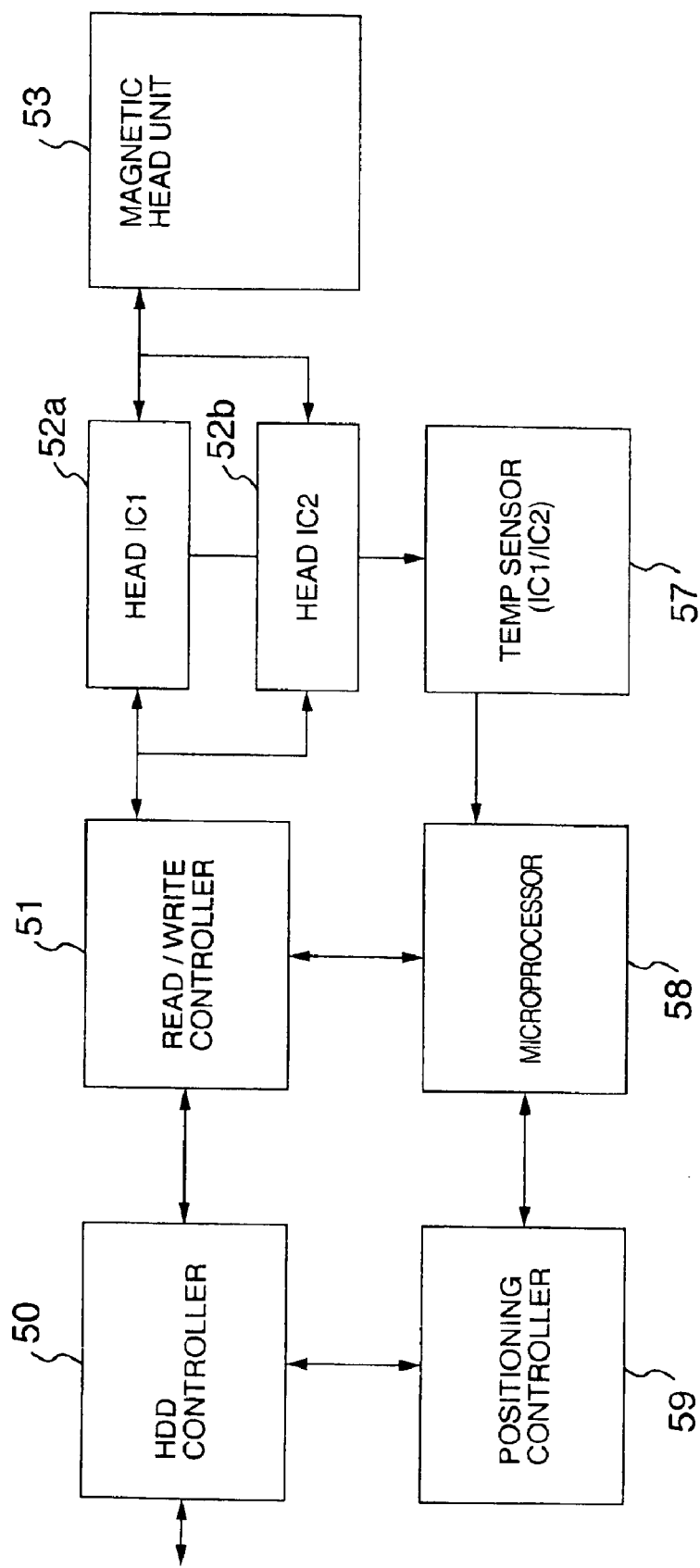
FIG. 10 is a block diagram showing the control circuit according to the fourth embodiment of the invention.

A fourth embodiment of the invention will be explained with reference to FIGS. 9 and 10. The difference between this embodiment and the first embodiment lies in that as shown in FIG. 9, the present embodiment has two head ICs 30a and 30b mounted. Also, as shown in FIG. 10, each head IC has a temperature sensor. The use of two ICs makes it possible to switch to the IC 52b when the other IC 52a approaches the tolerable temperature rise as detected by the temperature sensor. As a result, the same effect as the second embodiment is achieved. Specifically, as viewed from the magnetic head unit, power is continuously supplied from the IC to the magnetic head unit, and therefore the continuous read/write operation is possible. Also, from the viewpoint of the IC temperature rise, the alternate use of the two ICs is equivalent to the fact that one of the ICs is suspended in operation and can be cooled during the suspension time. Therefore, in the case where the two ICs are switched for every 0.17 s for the inner periphery, for example, as shown in the third embodiment, the same effect is obtained as if the IC is apparently continuously used at the rated power.

The experiments conducted by the inventors show that the temperature rise due to heating and the cooling due to the heat radiation last for substantially the same length of time. The use of two ICs alternately as described above, therefore, can prevent the faulty operation which otherwise might be caused by the temperature rise due to the heating of the IC itself. The effect of the present embodiment is especially significant for a magnetic disk device having a single magnetic head mounted thereon. Specifically, with the magnetic disk unit device having a plurality of magnet heads mounted thereon, in the case where the temperature of the IC of one of the magnetic heads increases beyond the tolerable value, the operation is switched to the other magnetic head unit to record the data with the particular other magnetic head unit (other IC).

In the case where only one magnetic head is provided and the other magnet head is unavailable for use, on the other hand, the available magnetic head is used with a lower duty factor as in the second embodiment, or the suspension time is inserted as in the third embodiment, resulting in the deteriorated performance of the read/write operation. On the other hand, the present embodiment using two ICs exhibits an especially high effect for the magnetic disk device having only one head. Also, the present embodiment is effective especially in the case where the two magnetic heads, if any, of the magnetic head unit cannot be switched, i.e. in the case where the continuous read/write operation is required with a single head.

Figure 11A:
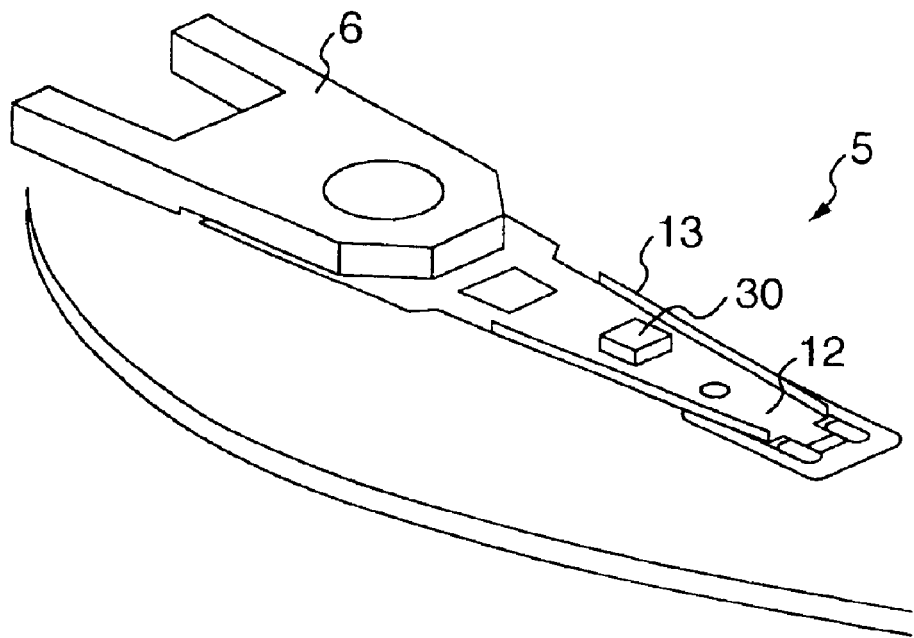
FIGS. 11A and 11B each show a different magnetic head supporting mechanism according to other embodiments of the invention.
Figure 11B:
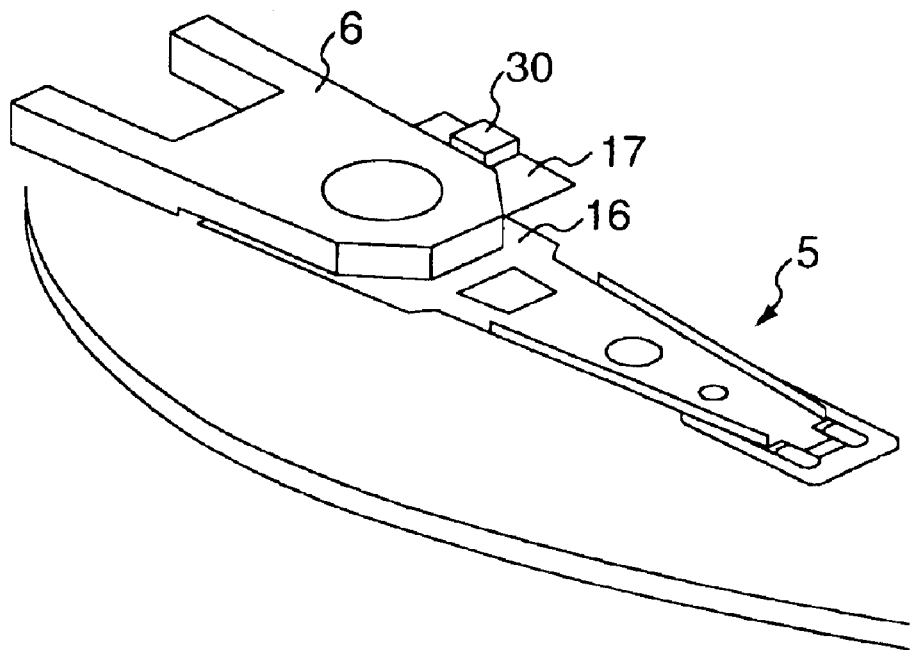

In the aforementioned embodiments, the IC is arranged on the outer peripheral side at the forward end of the guide arm. As shown in FIGS. 11A, 11B, however, the IC can be mounted on the suspension means or on the inner peripheral side at the forward end of the guide arm with equal effect. In the case where the IC is mounted on the suspension means as shown in FIG. 11A, the heat conduction to the suspension means increases and the cooling performance is improved. In the case where the IC is mounted on the inner peripheral side of the magnetic disk 4 as shown in FIG. 11B, on the other hand, the advantage is that the cooling performance (heat conduction) by the air flow is improved.

According to the embodiments described above, the temperature of the signal amplifier (IC) mounted on the magnetic head supporting mechanism can be controlled to not higher than a predetermined temperature without any special cooling means. Therefore, a large volume of information can be recorded/reproduced at high speed while securing reliability.

What is claimed is:

1. A magnetic disk device comprising a magnetic disk for recording information, a rotary mechanism for rotating said magnetic disk, a magnetic head unit for recording information on the rotating magnetic disk, a slider having mounted thereon said magnetic head unit and flying over said rotating magnetic disk, a magnetic head supporting mechanism for supporting said slider, and a positioning mechanism for setting said magnetic head unit at a predetermined radial position, wherein said magnetic head supporting mechanism has mounted thereon an integrated circuit (IC) for amplifying an information write/read signal of said magnetic head unit, and a control circuit is connected to said IC, and wherein said control circuit controls a recording frequency according to the radial position of said IC on said magnetic disk.

2. A magnetic disk device according to claim 1, wherein said control circuit operates so that the recording frequency is higher when said IC is located at an outer peripheral position of said magnetic disk than when said IC is located at an inner peripheral position of said magnetic disk.

* * * * *